(12) United States Patent
Zhu (10) Patent No.: US 11,226,656 B2
(45) Date of Patent: Jan. 18, 2022

(54) COMPUTER

(71) Applicants: BEIJING BOE MULTIMEDIA TECHNOLOGY CO., LTD., Beijing (CN); BOE TECHNOLOGY GROUP CO., LTD., Beijing (CN)

(72) Inventor: Hu Zhu, Beijing (CN)

(73) Assignees: BEIJING BOE MULTIMEDIA TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 240 days.

(21) Appl. No.: 16/497,260

(22) PCT Filed: Feb. 21, 2019

(86) PCT No.: PCT/CN2019/075722
§ 371 (c)(1),
(2) Date: Sep. 24, 2019

(87) PCT Pub. No.: WO2019/227980
PCT Pub. Date: Dec. 5, 2019

(65) Prior Publication Data
US 2021/0286410 A1     Sep. 16, 2021

(30) Foreign Application Priority Data
May 28, 2018  (CN) .......................... 201810524320.5

(51) Int. Cl.
*G06F 1/16* (2006.01)
(52) U.S. Cl.
CPC .......... *G06F 1/1654* (2013.01); *G06F 1/1615* (2013.01); *G06F 1/1616* (2013.01);
(Continued)

(58) Field of Classification Search
CPC .... G06F 1/1654; G06F 1/1615; G06F 1/1616; G06F 1/1618; G06F 1/1669
See application file for complete search history.

(56) References Cited

U.S. PATENT DOCUMENTS

| 9,063,584 B2 | 6/2015 | Fuller et al. | |
| 2013/0094134 A1* | 4/2013 | Ashcraft | G06F 1/1654 |
| | | | 361/679.29 |

(Continued)

FOREIGN PATENT DOCUMENTS

| CN | 102339091 A | * | 2/2012 |
| CN | 102339091 A | | 2/2012 |

(Continued)

OTHER PUBLICATIONS

The First Chinese Office Action dated Nov. 4, 2019; Appln. No. 201810524320.5.

(Continued)

*Primary Examiner* — Nidhi Thaker (57) ABSTRACT

The present disclosure provides a computer, including: a display component, having a display surface; a main body, including a central processor unit and having a reference surface; and a connector component, configured to connect the display component and the main body and to maintain a relative position of the display component and the main body to be at least in a first state and a second state. In the first state, a first angle is between the display surface and the reference surface; in the second state, a second angle is between the display surface and the reference surface, the first angle is different from the second angle, and the second angle is not zero; and in the first state and in the second state, the main body is located on a side of the display component facing away from the display surface.

18 Claims, 9 Drawing Sheets

(52) U.S. Cl.
CPC .......... *G06F 1/1618* (2013.01); *G06F 1/1669* (2013.01); *G06F 1/1637* (2013.01); *G06F 1/1667* (2013.01)

(56) References Cited

U.S. PATENT DOCUMENTS

| | | | |
|---|---|---|---|
| 2014/0204518 A1* | 7/2014 | Lin | G06F 1/1616 361/679.12 |
| 2015/0083615 A1* | 3/2015 | Lay | F16M 11/38 206/45.24 |
| 2015/0277499 A1* | 10/2015 | MacDonald | G01L 19/00 361/679.09 |
| 2016/0127001 A1* | 5/2016 | Mehandjiysky | A45C 11/00 455/575.8 |
| 2016/0128439 A1* | 5/2016 | Senatori | G06F 1/162 206/45.2 |
| 2016/0299533 A1* | 10/2016 | Mehandjiysky | G06F 1/1654 |
| 2016/0349794 A1* | 12/2016 | Yeh | G06F 3/0426 |
| 2017/0090516 A1* | 3/2017 | Ku | G06F 1/1669 |
| 2018/0081401 A1 | 3/2018 | Linegar et al. | |
| 2018/0309232 A1* | 10/2018 | Cho | H01R 13/60 |
| 2020/0301480 A1* | 9/2020 | Miller | G06F 1/1681 |

FOREIGN PATENT DOCUMENTS

| | | |
|---|---|---|
| CN | 104214480 A | 12/2014 |
| CN | 104375567 A | 2/2015 |
| CN | 104635857 A | 5/2015 |
| CN | 204808118 U | 11/2015 |
| CN | 107435683 A | 12/2017 |
| CN | 108762393 A | 11/2018 |

OTHER PUBLICATIONS

Second Chinese Office Action dated Jul. 23, 2020; Application No. 201810524320.5.

* cited by examiner

COMPUTER

The present application claims the priority of the Chinese Patent Application No. 201810524320.5 filed on May 28, 2018, the disclosure of which is incorporated herein by reference in its entirety as a part of the present application.

TECHNICAL FIELD

Embodiments of the present disclosure relate to a computer.

BACKGROUND

Currently, office scenes become more and more diversified. In different office scenes, laptop computers, desktop computers, and wall-mounted TVs are required so as to satisfy various daily office occasions.

SUMMARY

At least one embodiment of the present disclosure provides a computer. The computer comprises: a display component, having a display surface; a main body, comprising a central processor unit and having a reference surface; and a connector component, configured to connect the display component and the main body and at least to maintain a relative position of the display component and the main body to be in a first state and a second state. In the first state, a first angle is between the display surface of the display component and the reference surface of the main body; In the second state, a second angle is between the display surface of the display component and the reference surface of the main body, the first angle is different from the second angle, and the second angle is not zero; and in the first state and in the second state, the main body is located on a side of the display component facing away from the display surface.

In an example, the connector component comprises at least one rotating shaft, and the main body and the display component are connected by the at least one rotating shaft to be rotatable with respect to each other.

In an example, the display component has a first edge portion, and the main body has a second edge portion and a third edge portion opposite to each other; in the first state, the second edge portion of the main body is closer to the at least one rotating shaft than the third edge portion of the main body, and the at least one rotating shaft is closer to the first edge portion of the display component than the third edge portion of the main body.

In an example, the display component has a first edge portion, and the main body has a second edge portion and a third edge portion opposite to each other; in the first state, the second edge portion of the main body is closer to the at least one rotating shaft than the third edge portion of the main body, and the at least one rotating shaft is farther away from the first edge portion of the display component than the third edge portion of the main body.

In an example, at least one of the display component and the main body is provided with an adsorption member, and the display component and the main body are attracted to each other together by the adsorption member.

In an example, the at least one rotating shaft is connected to the display component by a back plate.

In an example, at least one of the display component, the back plate and the main body is provided with an adsorption member, at least another one of the display component, the back plate and the main body is attracted to the at least one of the display component, the back plate and the main body by the adsorption member.

In an example, in the first state, a hole for hanging is disposed on a side of the main body facing away from the display component.

In an example, the computer further comprises a keyboard rotating shaft and a keyboard, wherein the display component and the keyboard are rotatable with respect to each other by the keyboard rotating shaft.

In an example, the at least one rotating shaft comprises at least one of a first rotating shaft and a second rotating shaft, the connector component further comprises a bracket plate, the bracket plate and the display component are connected by the first rotating shaft to be rotatable with respect to each other, and the bracket plate and the main body are connected by the second rotating shaft to be rotatable with respect to each other.

In an example, the at least one rotating shaft comprises the first rotating shaft and the second rotating shaft, and the first rotating shaft and the second rotating shaft are located at opposite ends of the bracket plate.

In an example, the connector component further comprises a main body box having a first accommodation space, and the main body box is configured that the main body is removable from the first accommodation space.

In an example, the computer further comprises a keyboard and an accessory accommodation base plate. The accessory accommodation base plate is fixedly connected to the main body box, and the keyboard and the accessory accommodation base plate are configured to constitute a second accommodation space for accommodating a computer accessory.

In an example, an upper surface of the keyboard is concave.

In an example, a back portion of the main body box is provided with an adsorption member for purpose of attracting the keyboard so that the keyboard is accommodated at the back portion of the main body box.

In an example, the connector component comprises a fabric and an adsorption member, and a main body interface and a display component interface are disposed on the fabric and are located on two surfaces, facing away from, of the fabric; the main body and the display component are respectively connected to the main body interface and the display component interface provided on the fabric, and the main body and the display component are attracted to each other together by the adsorption member.

In an example, the adsorption member is located in a fabric portion of a fabric keyboard.

In an example, the computer further comprises a keyboard, wherein the keyboard is connected to a surface of the fabric facing away from the main body interface.

In an example, the keyboard is attachable to the display component.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

By reading the detailed descriptions of the non-restrictive embodiments with reference to the following drawings, other features, objects and advantages of the present disclosure will become more apparent.

DETAILED DESCRIPTION

In order to make objects, technical details and advantages of embodiments of the present disclosure clear, the technical solutions of the embodiments of the present disclosure will be described in a clearly and fully understandable way in connection with the related drawings. It is apparent that the described embodiments are just a part but not all of the embodiments of the disclosure. Based on the described embodiments herein, those skilled in the art can obtain, without any inventive work, other embodiment(s) which should be within the scope of the disclosure.

It should be noted that, the embodiments of the present disclosure and the features therein can be combined with each other in the absence of conflicts. The present disclosure will be described in detail below with reference to the accompanying drawings and in combination with the embodiments.

If a laptop computer, a desktop computer, and a wall-mounted television are separately prepared in a same office scene, the cost is high, file sharing therebetween is troublesome, and the efficiency is low; moreover, the available office region is occupied by various wires related to the computers, and the various wires are disordered and easily entangled to cause malfunctions and affect the user's mood.

Furthermore, the desktop computer is bulky and takes up space, so it is difficult to store and transport in batches; and in a case that the laptop computer and an integrated computer are broken, the whole machine has to be replaced, the maintenance is troublesome and the cost is high.

At least one embodiment of the present disclosure provides a computer, and the computer comprises: a display component, which has a display surface; a main body, which comprises a central processor unit and has a reference surface; and a connector component, which is configured to connect the display component and the main body and to maintain a relative position of the display component and the main body to be at least in a first state and a second state; in the first state, a first angle is between the display surface of the display component and the reference surface of the main body; in the second state, a second angle is between the display surface of the display component and the reference surface of the main body, the first angle is different from the second angle, and the second angle is not zero; and in the first state and in the second state, the main body is located on a side of the display component facing away from the display surface.

Figure 1:
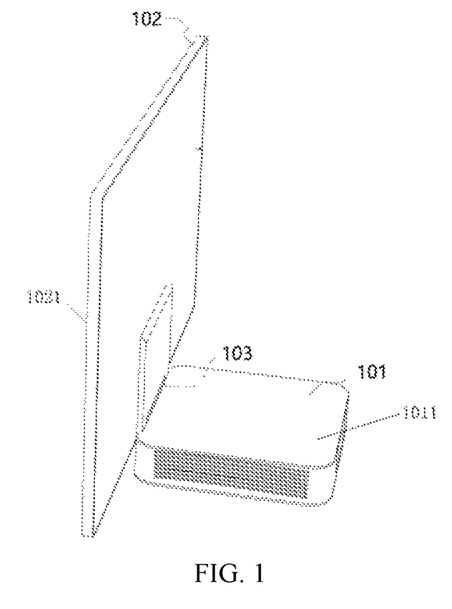
FIG. 1 is a schematic structural diagram of a computer provided by embodiments of the present disclosure.

With reference to FIG. 1, the computer provided by at least one embodiment of the present disclosure comprises the display component 102, the main body 101, and the connector component 103 for connecting the display component and the main body.

The connector component 103 is a rotating shaft or a flexible connector component, so that the relative position of the display component 102 and the main body 101 is able to be switched between the first state and the second state. In the first state, the main body 101 is closely attached to the display component 102, and for example the angle between the main body 101 and the display component 102 is zero; for example, the angle between the reference surface 1011 of the main body 101 and the display surface of the display component 102 is zero. In the second state, the main body 101 or the connector component 103 serves as a supporter to support the display component 102, so that a set angle is between the display component 102 and a horizontal plane, and for example a non-zero angle is between the main body 101 and the display component 102. For example, a non-zero angle is between the reference surface 1011 of the main body 101 and the display surface of the display component 102.

The connector component 103 is the rotating shaft or the flexible connector component, and the display component 102, for example, is a display screen.

Because the relative position of the main body 101 and the display component 102 is switched between the above two states, the computer meets the requirements of different office occasions and the cost is reduced. Because the main body 101 and the display component 102 are connected by the connector component 103 such as the rotating shaft and the like, data lines between the main body 101 and the display component 102 are arranged in the connector component 103, so that there is no need to provide separate data lines to reduce the trouble caused by too much data lines.

Several different implementations are described below by means of exemplary embodiments.

Figure 2:
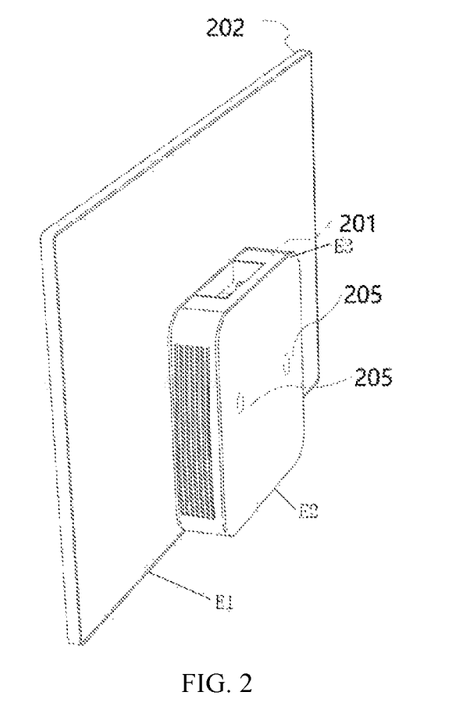
FIG. 2 to FIG. 3 are schematic structural diagrams of the computer in at least one embodiment provided by the embodiments of the present disclosure.
Figure 3:
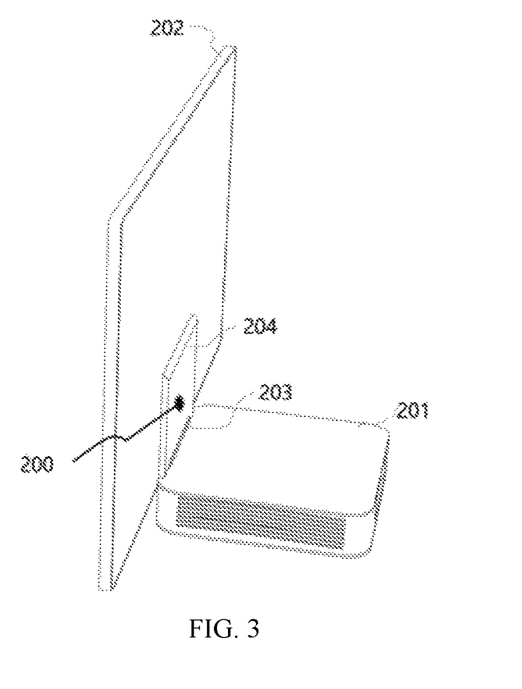

As illustrated in FIG. 2 and FIG. 3, in the embodiment, the connector component for example is a rotating shaft 203, one end of the rotating shaft 203 is connected to a back plate 204, the other end of the rotating shaft 203 is connected to the main body 201, the back plate 204 is fixed on a back portion of the display component 202, and the back portion of the display component 202 is on a side, having no screen, of the display component 202.

The main body 201 and the display component 202 are connected by the rotating shaft 203 to be rotatable with respect to each other.

In the first state, as illustrated in FIG. 2, the main body 201 is closely attached to the back plate 204, and the main body 201 and the back plate 204 are fixed with each other by an adsorption member 200 disposed in the back plate 204. For example, the adsorption member is a magnet.

The display component 202 has a first edge portion E1, and the main body 201 has a second edge portion E2 and a third edge portion E3 opposite to each other.

In the first state, the second edge portion E2 of the main body is closer to the rotating shaft 203 than the third edge portion E3 of the main body, and the rotating shaft 203 is closer to the first edge portion E1 of the display component 202 than the third edge portion E3 of the main body.

In the first state, the display component 202 rotates toward the main body 201 by the rotating shaft 203 until the back plate 204 is attached to a metal shell on a surface of the main body 201. The adsorption member disposed in the back plate 204 and the metal shell on the surface of the main body 201 are attracted with each other together to achieve a closely attaching and fixing effect. In this state, the computer for example is hung on a wall in a wall-mounted mode by a hole 205 for hanging provided on a metal shell, facing away from the display component, of the main body 201. The user adjusts the angle of the display component 202 by rotating the rotating shaft 203 to achieve a desired display effect. If the main body 201 and the display component 202 are placed on a table, the computer is used a tablet computer.

In the second state, as illustrated in FIG. 3, the main body 201 serves as a supporter to support the display component 202 to stand with a set angle.

In the second state, the main body 201 is placed on the table, and the display component 202 and the back plate 204 are connected to the main body 201 by the rotating shaft 203. The user adjusts the angle of the display component 202 by rotating the rotating shaft 203 to achieve a desired display effect; the data lines and power lines of the display component 202 and the main body 201 are arranged in the rotating shaft 203.

Figure 4:
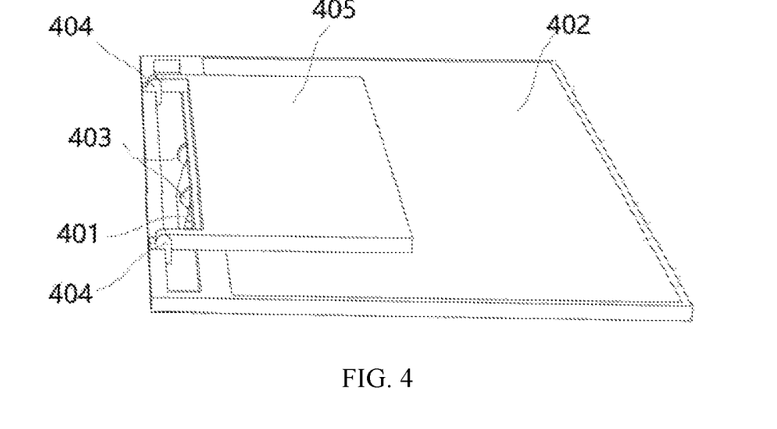
FIG. 4 to FIG. 6 are schematic structural diagrams of the computer in at least one embodiment provided by the embodiments of the present disclosure.
Figure 5:
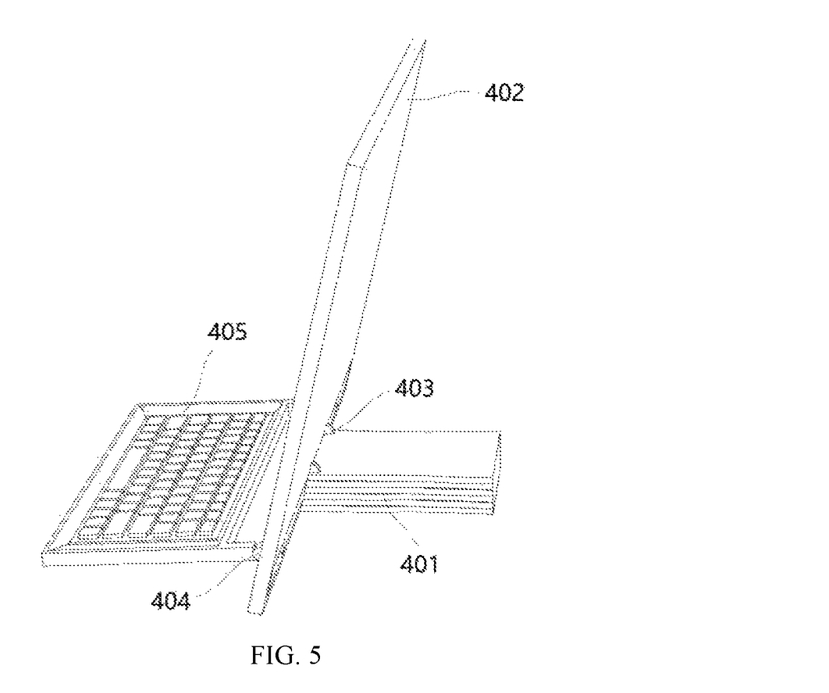
Figure 6:
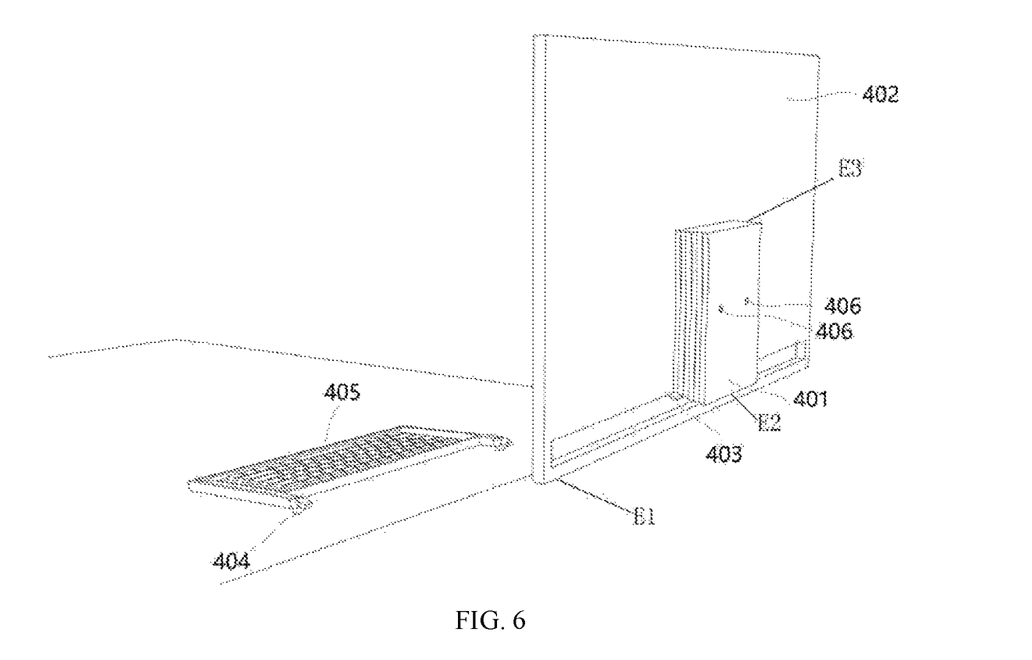

As illustrated in FIG. 4, FIG. 5 and FIG. 6, in the computer provided by the embodiment, the connector component is a rotating shaft 403, one end of the rotating shaft 403 connects to the main body 401, and the other end of the rotating shaft 403 connects to the display component 402.

The main body 401 and the display component 402 are connected by the rotating shaft 403 to be rotatable with respect to each other.

In the first state, as illustrated in FIG. 4 and FIG. 6, the main body 401 is closely attached to the display component 402, and the main body 401 and the display component 402 are attracted and fixed with each other by the adsorption member arranged on the back portion of the display component 402.

The display component 402 has the first edge portion E1, and the main body 401 has the second edge portion E2 and the third edge portion E3 opposite to each other.

In the first state, the second edge portion E2 of the main body 401 is closer to the rotating shaft 403 than the third edge portion E3 of the main body 401; and the rotating shaft 403 is closer to the first edge portion E1 of the display component 202 than the third edge portion E3 of the main body 401.

In the first state, the display component 402 rotates toward the main body 401 by the rotating shaft 403 until the display component 402 is attached to the metal shell on an upper surface of the main body 201. The adsorption member disposed on the back portion of the display component 402 and the metal shell on the upper surface of the main body 401 are attracted with each other together to achieve the closely attaching and fixing effect.

In the present embodiment, the adsorption member for example is the magnet.

In the second state, as illustrated in FIG. 5, the main body 401 serves as the supporter to support the display component 202 to stand with a set angle.

In the second state, the main body 401 is placed on the table, and the display component 402 is connected to the main body 201 by the rotating shaft 203. The user adjusts the angle of the display component 402 by rotating the rotating shaft 203 to achieve a desired display effect; the data lines and the power lines of the display component 202 and the main body 201 are arranged in the rotating shaft 403.

Further, the computer further comprises a keyboard rotating shaft 404, and one end of the keyboard rotating shaft 404 connects to a keyboard 405 and the other end of the keyboard rotating shaft 404 connects to the display component 402.

An upper surface of the keyboard 405 is concave. The upper surface of the keyboard 405 has an edge with a width of 2 mm to 10 mm, and an upper surface of the edge is made of a rubber material. That is, in the upper surface of the keyboard 405, an upper surface of a button portion is depressed to an inner side of the keyboard 405 relative to the upper surface of the edge portion. Thus, in a case that the keyboard 405 rotates by the keyboard rotating shaft 404 to attach to the display component 402, the concave configuration protects the buttons of the keyboard 405, and the rubber material surface of the edge protects the surface of the display component 402.

For example, the keyboard 405 is a wireless keyboard.

In the first state, there are three ways of using the computer as follows.

A portable mode: as illustrated in FIG. 4, the keyboard 405 is attached to the side of the display component 402 having the screen, the adsorption member disposed in the keyboard 405 and a metal frame under the screen of the display component 402 are attracted to each other together to achieve a closely attaching and fixing effect, and the user is able to carry a middle of a bottom metal frame of the display component 402 by hand to move the computer freely.

A tablet mode: the keyboard 405 and the keyboard rotating shaft 404 are removed from the bottom metal frame of the display component 402, and the main body 401 and the display component 402 are placed on the table.

A wall-mounted mode: as illustrated in FIG. 6, the computer is hung on the wall by the hole 406 for hanging provided on a side of the main body 401 facing away from the display component 402, the user removes the keyboard 405 and the keyboard rotating shaft 404 from the bottom metal frame of the display component 402 and uses the keyboard at a desired position, the user adjusts the angle of the display component 402 by rotating the rotating shaft 403 to achieve a desired display effect.

In the second state, as illustrated in FIG. 5, the keyboard 405 is adsorbed on the bottom metal frame of the display component 402 by the adsorption member disposed in the keyboard rotating shaft 404; and the user adjusts a typing angle by rotating the keyboard rotating shaft 404. Alternatively, the user removes the keyboard 405 and the keyboard rotating shaft 404 from the bottom metal frame of the display component 402 and uses the keyboard at a desired position.

As illustrated in FIG. 7 to FIG. 11, in the computer provided in the embodiment, for example, the connector component is a double-rotating bracket 703 provided with a main body slot 704. A first rotating shaft 7031 of the double-rotating bracket 703 respectively connects to the display component 702 and the bracket plate 7033. A second rotating shaft 7032 of the double-rotating bracket respectively connects to an upper surface of the main body slot 704 and the bracket plate 7033. The main body 701 is arranged in the main body slot 704. Herein, the double-rotating bracket 703 provided with the main body slot 704 is an example of a main body box, and the main body slot 704 is an example of a first accommodation space of the main body box.

The main body 701 and the display component 702 are connected by the first rotating shaft 7031 and the second rotating shaft 4032 to be rotatable with respect to each other.

Figure 9:
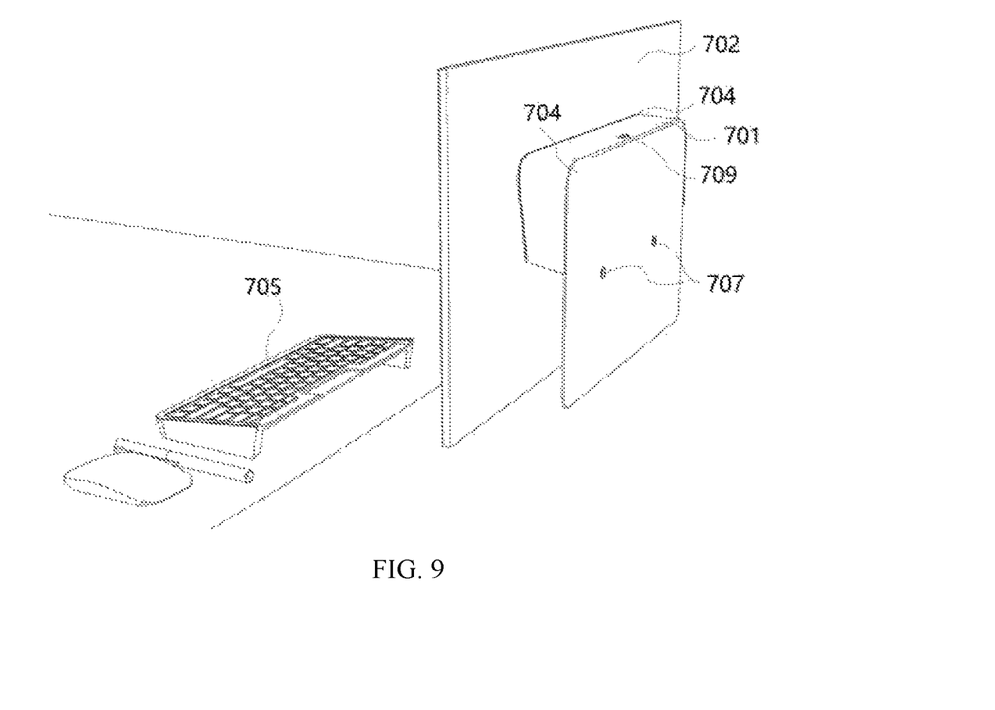
Figure 10:
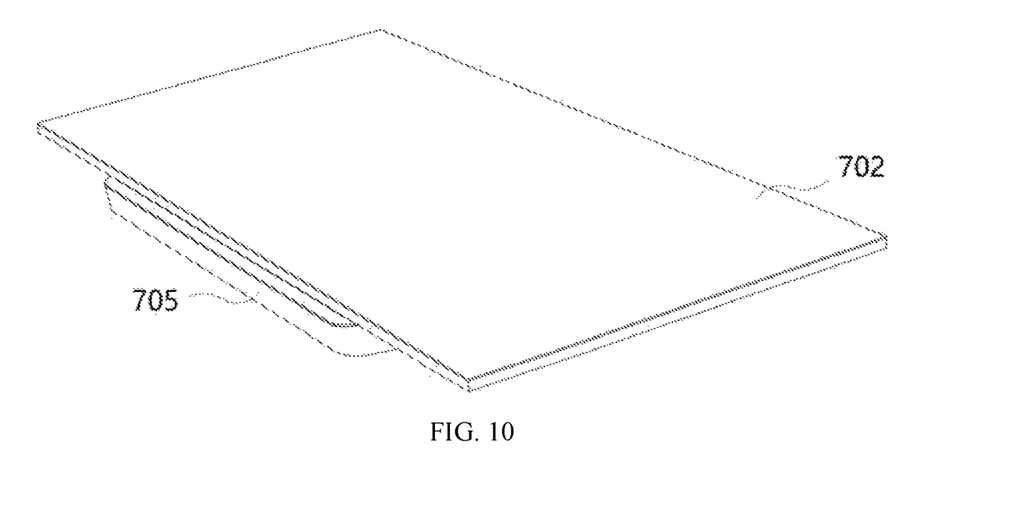

In the first state, one side of the bracket plate 7033 is closely attached to the display component 702, and the other side of the bracket plate 7033 is closely attached to an upper surface of the main body slot 704 or embedded in the upper surface of the main body slot 704. The adsorption member disposed in the bracket plate 7033 is attracted to the main body slot 704 and the display component 702 to achieve a closely attaching and fixing effect. In a case that the bracket plate 7033 is embedded in the upper surface of the main body slot 704, the adsorption member disposed in the bracket plate 7033 is attracted to the main body 701 and the display component 702 to achieve the closely attaching and fixing effect, or the adsorption member disposed in the display component 702 is attracted to the upper surface of the main body slot 704 to achieve the closely attaching and fixing effect.

For example, the first state is used for the wall-mounted mode or the tablet mode.

Figure 7:
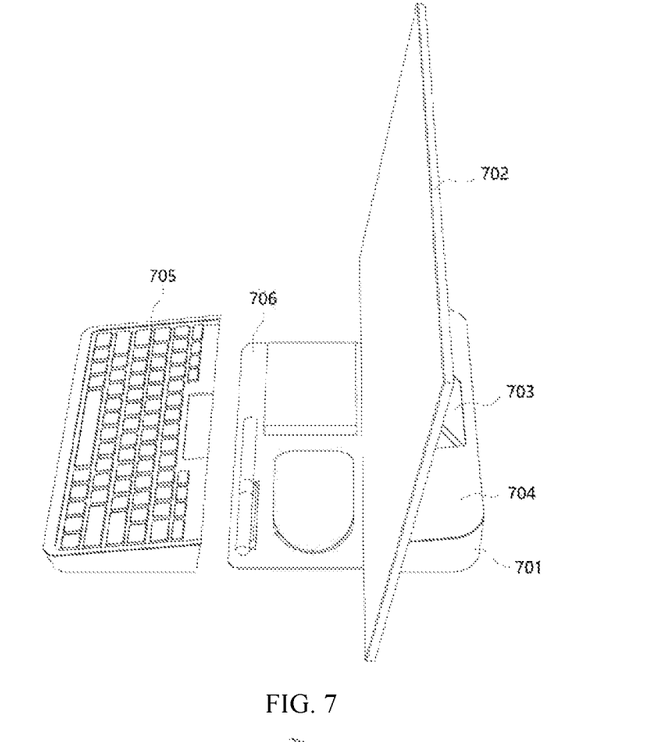
FIG. 7 to FIG. 11 are schematic structural diagrams of the computer in at least one embodiment provided by the embodiments of the present disclosure.
Figure 8:
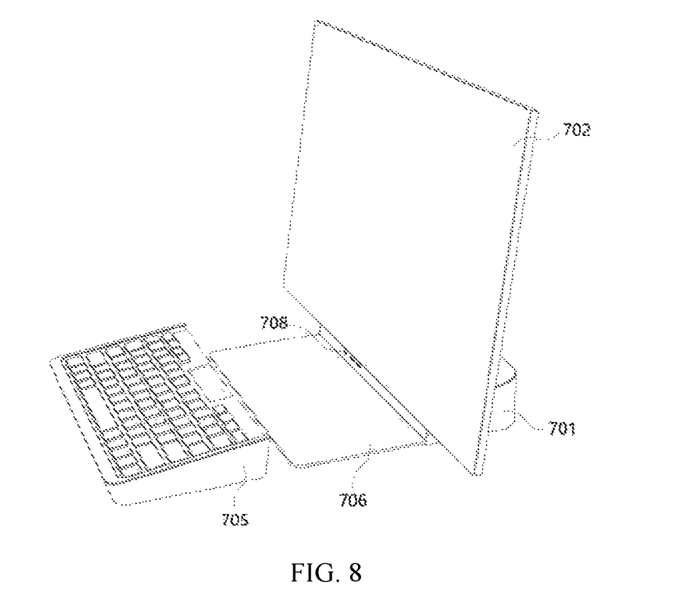

In the second state, the main body 701 is in the main body slot 704, and the double-rotating bracket 703 supports the display component 702 to stand at a set angle.

For ease of use, the computer further comprises a keyboard 705.

The double-rotating bracket 703 further comprises: an accessory accommodation base plate 706.

In the first state, if the computer is used as the tablet computer or in other situations where the keyboard is not required, the keyboard 705 is accommodated in the double-rotating bracket 703 by the accessory accommodation base plate 706.

Further, an accommodation space is between a bottom of the keyboard 705 and the accessory accommodation base plate 706 for accommodating computer accessories, such as a wireless mouse, a stylus and other computer accessories.

An upper surface of the keyboard 705 is concave. The upper surface of the keyboard 405 has an edge with a width of 5 mm to 15 mm, and the surface of the edge is made of a rubber material.

The keyboard 705 is preferably a wireless keyboard that further reduces the amount of the data lines.

In the first state, there are several ways of using the computer as follows.

The wall-mounted mode: as illustrated in FIG. 9, the display component 702 rotates toward the main body slot 704 by the double-rotating bracket 703 until the display component 702 is attached to the upper surface of the main body slot 704. The adsorption member disposed in the double-rotating bracket 703 is attracted to the upper surface of the main body slot 704 to achieve the closely attaching and fixing effect. At this time, the computer is hung on the wall in a wall-mounted mode by the hole 707 for hanging provided on a lower surface of the main body slot. The user removes the wireless keyboard 705 from the accessory accommodation base plate 706 and place it at a desired position. The accessories such as the mouse and the stylus for example are also removed from the accessory accommodation base plate 706 to place them at desired positions. The user adjusts the angle of the display component 702 by rotating the double-rotating bracket 703 to achieve a desired display effect. A rear interface 709 is arranged on the main body 701 to facilitate data transmission.

The portable and tablet mode: as illustrated in FIG. 10, the display component 702 rotates toward the main body slot 704 by the double-rotating bracket 703 until the display component 702 is attached to the upper surface of the main body slot 704. The adsorption member disposed in the double-rotating bracket 703 is attracted to the upper surface of the main body slot 704 to achieve the closely attaching and fixing effect. The upper surface of the wireless keyboard 705 is concave and the edge of the wireless keyboard 705 in a range of about 10 mm has a surface made of rubber material, so as to protect the back surface of the display component 702 and the buttons of the wireless keyboard 705. The adsorption member disposed in the wireless keyboard 705 and the adsorption member disposed on the back portion of the display component 702 are attracted with each other together to achieve the closely attaching and fixing effect. The computer in the first state for example is placed on the table and is used as the tablet computer, and the computer accessories such as the mouse, the stylus, a micro mobile hard disk for example are taken out and placed at the required positions for use.

In the second state, as illustrated in FIG. 7 and FIG. 8, the main body slot 704 and the accessory accommodation base plate 706 are placed on the desktop. The display component 702 connects the upper surface of the main body slot 704 by the double-rotating bracket 703. The user adjusts the angle of the display component by rotating the double-rotating bracket 703 until the bottom of the display component 702 is closely attached with the main body slot 704 and is fixed by a built-in adsorption member; the wireless keyboard 705 is removed from the accessory accommodation base plate 706 and is placed at the required position for use; and the mouse, the stylus, and the micro mobile hard disk and other computer accessories for example, are removed from the accessory accommodation base plate 706 and are placed at the required positions for use. A front interface 708 of the main body box is exposed below the display component 702, and corresponding accessories are connected to the front interface 708 according to the user's requirements.

Figure 11:
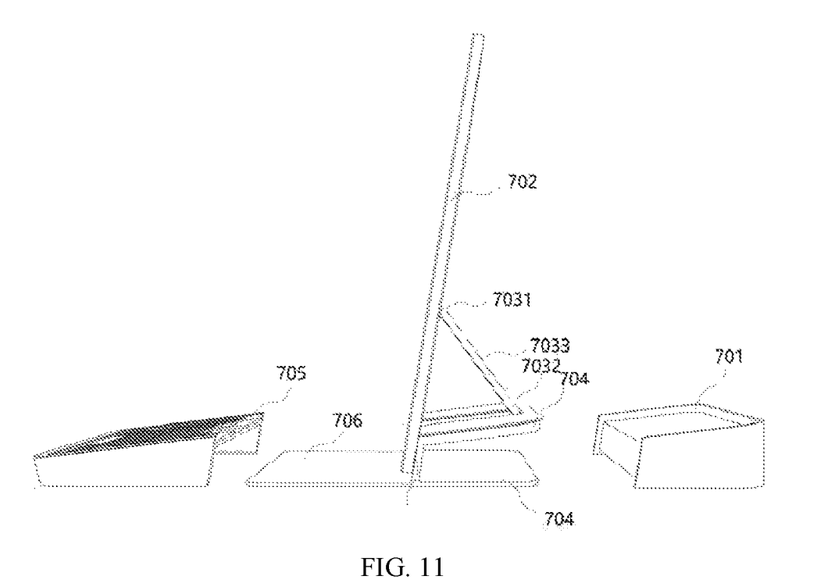

As illustrated in FIG. 11, in the present embodiment, the main body 701 is removable from the main body slot 704 for easy to upgrade, repair or use independently.

It is understood that the first rotating shaft 7031 and the second rotating shaft 7032 do not have to exist at the same time.

In another example, the computer illustrated in FIG. 7 to FIG. 11 only comprises the first rotating shaft 7031, but does not comprise the second rotating shaft 7032. In this case, in FIG. 11, one end of the bracket plate 7033, which is opposite to the first rotating shaft 7031 abuts against the upper surface of the main body slot 704.

In still another example, the computer illustrated in FIG. 7 to FIG. 11 only comprises the second rotating shaft 7031, but does not comprise the first rotating shaft 7032. In this case, in FIG. 11, one end of the bracket plate 7033, which is opposite to the second rotating shaft 7031 abuts against the back surface of the display component 702.

It is understand that, in the present embodiment, the main body slot 704 of the double-rotating bracket 703 may be omitted. In an example, the second rotating shaft 7032 in FIG. 11 is in direct connect to the main body 701. In another example, the second rotating shaft 7032 directly abuts on the main body 701.

As illustrated in FIG. 12 to FIG. 15, in the computer provided in the present embodiment, the connector component, for example, is a main body box 1205 having a cover plate 1204. The main body box 1205 and the cover plate 1204 are connected by a rotating shaft 1203. The main body is arranged in the main body box 1205, and the cover plate 1204 is provided with the adsorption member for attracting the display component 1202. An exposed contact point 1208 is arranged on the cover plate 1204. After the exposed contact point 1208 is in contact with a corresponding exposed contact point on the display component 1202, a signal communication between the main body 1201 and the display component 1202 is realized.

The main body 1201 and the display component 1202 are connected by the rotating shaft 1203 to be rotatable with respect to each other.

Figure 12:
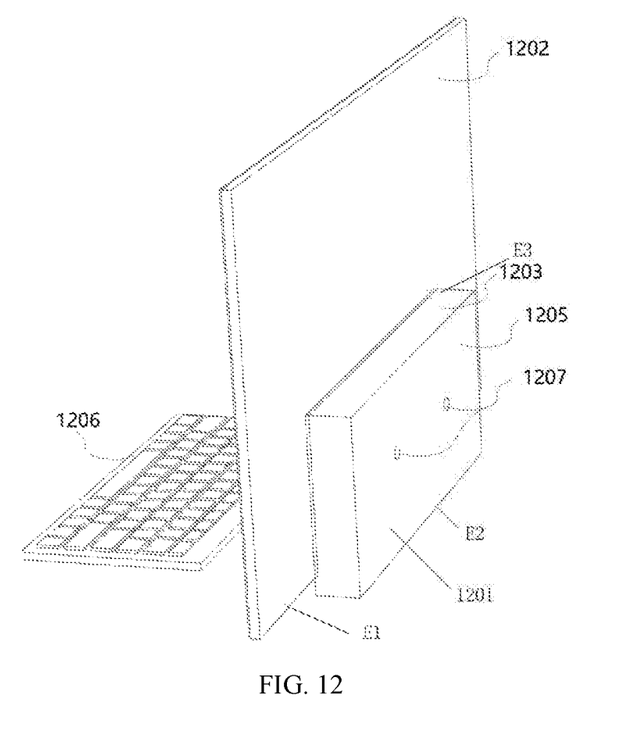
FIG. 12 to FIG. 15 are schematic structural diagrams of the computer in at least one embodiment provided by the embodiments of the present disclosure.

In the first state, the cover plate 1204 attaches to the display component 1202 and covers the main body box 1205, so that the main body box 1205 is closely attached to the display component 1202.

The display component 1202 has the first edge portion E1, and the main body 201 has the second edge portion E2 and the third edge portion E3 opposite to each other.

In the first state, the second edge portion E2 of the main body 1201 is farther away from the rotating shaft 1203 than the third edge portion E3 of the main body 1201, and the rotating shaft 203 is farther away from the first edge portion E1 of the display component 1202 than the second edge portion E2 of the main body 1021.

Figure 13:
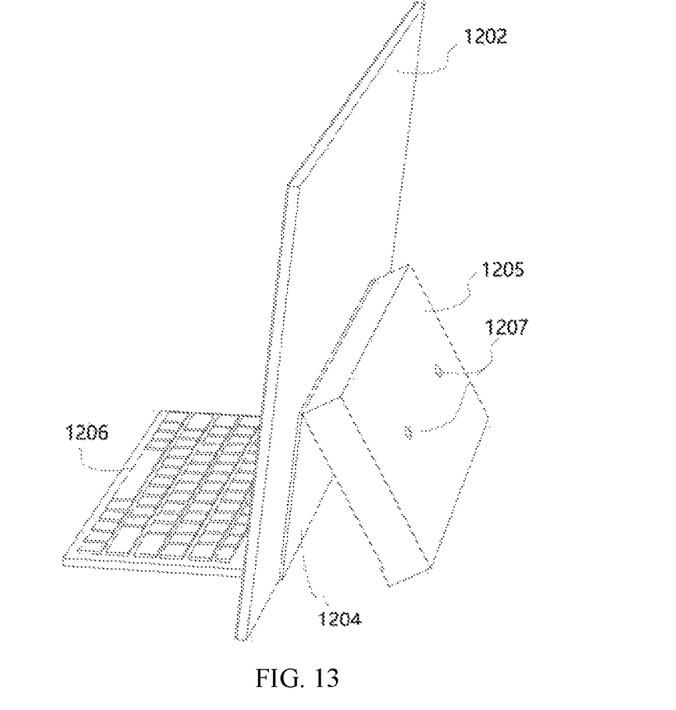

In the second state, the cover plate 1204 attaches to the display component 1202 and an angle is between the cover plate 1204 and the main body box 1205 by rotating the rotating shaft 1203, so that the main body box 1205 serves as the supporter to support the display component 1202 to stand at a set angle.

Figure 14:
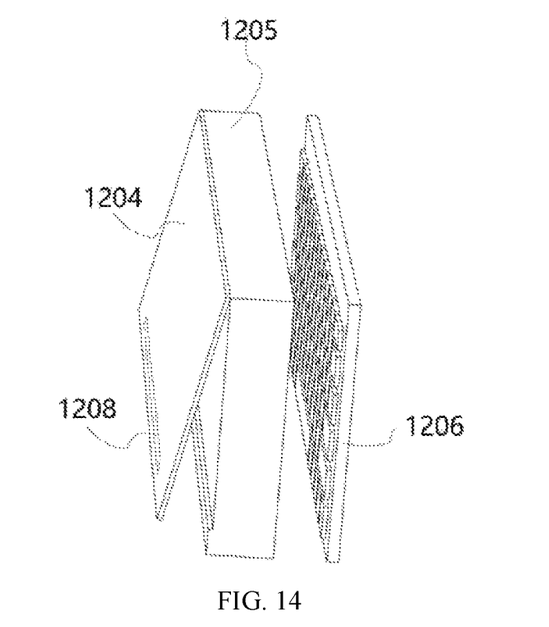

Further, as illustrated in FIG. 14, the adsorption member is arranged at the back portion of the main body box 1205 for purpose of attracting the keyboard 1206 so that the keyboard 1206 is accommodated at the back portion of the main body box 1205. The back portion of the main body box 1205 faces away from the cover plate 1204.

In the first state, as illustrated in FIG. 12, the display component 1202 is attached to and connected with the cover plate 1204, and the display component 1202 rotates toward the main body box 1205 until the main body box 1205 is completely closed by the cover plate 1204, the adsorption member disposed in the cover plate 1204 and the metal shell on the surface of the main body box 1205 are attracted with each other together to achieve the closely attaching and fixing effect. At this time, if the computer is hung on the wall by the hole 1207 for hanging provided on the back portion of the main body box 1205, the wall-mounted mode is realized. The user for example removes the keyboard 1206 from the main body box 1205 and places it at the desired position for use.

In the second state, as illustrated in FIG. 13, the cover plate 1204 is attached to and connected with the back portion of the display component 1202 by the adsorption member disposed in the cover plate 1204. The data lines and the power lines of the main body box 1205 are connected with the display component 1202 through the exposed contact points 1208 on the cover plate 1204. The bottom of the display component 1202 and the edge of the main body box 1205 are placed on the desktop, the user adjusts the angle between the cover plate 1204 and the main body box 1205 by rotating to adjust the placement angle of the display component 1202 to achieve a desired display effect.

Figure 15:
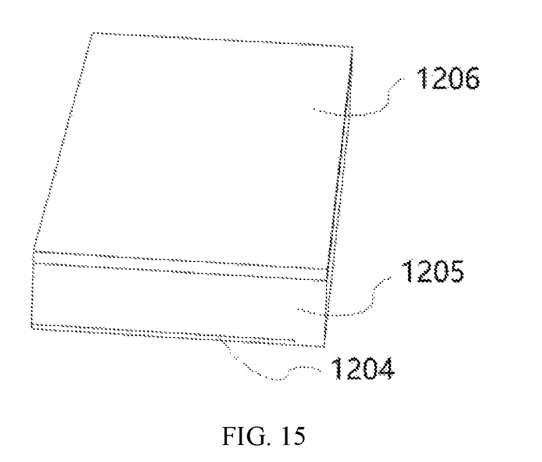

In the embodiment, the main body box is able to be carried separately. As illustrated in FIG. 15, both the main body box 1205 and the cover plate 1204 are separated from the display component 1202, that is, the main body box 1205 having the main body is able to be carried separately for easy to upgrade, repair or use independently.

Figure 16:
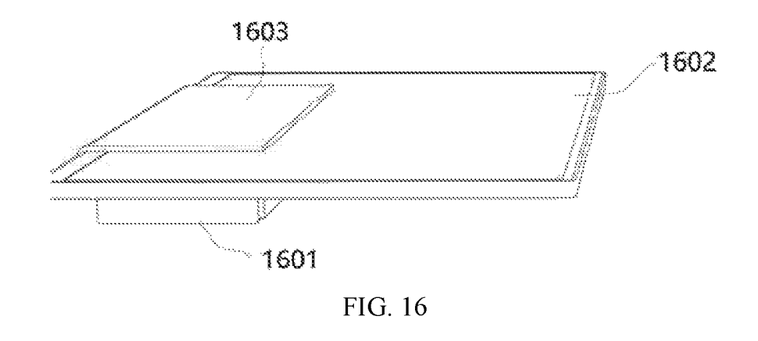
FIG. 16 to FIG. 18 are schematic structural diagrams of the computer in at least one embodiment provided by the embodiments of the present disclosure.
Figure 17:
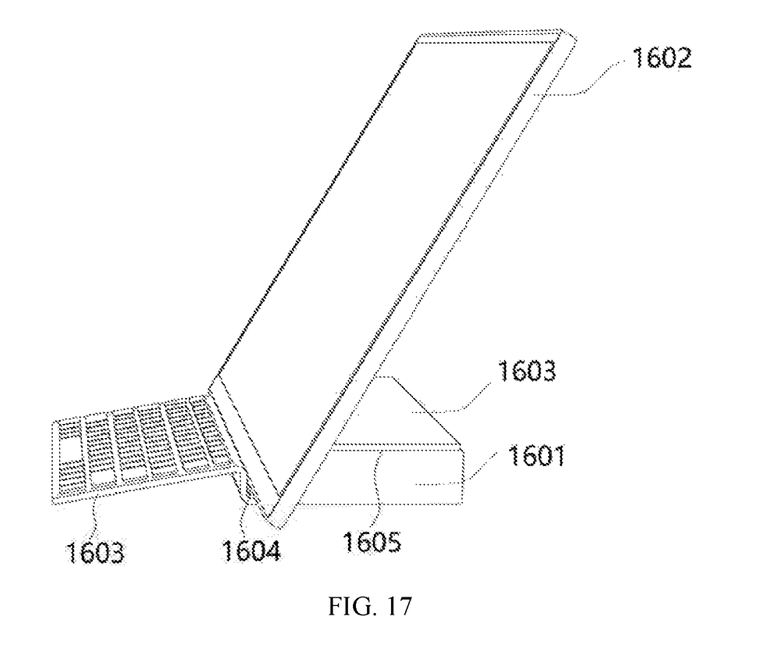
Figure 18:
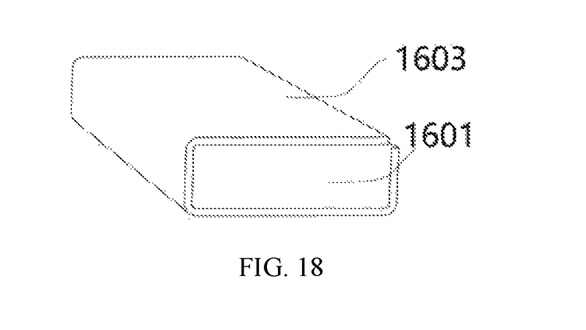

As illustrated in FIG. 16 to FIG. 18, in the computer provided by the embodiment, the connector component, for example, is a fabric keyboard 1603 provided with a main body interface 1605 and a display component interface 1604. The fabric keyboard 1603 has a non-keyboard region which is farther away from the user than a keyboard region provided with the keyboard. The main body interface 1605 and the display component interface 1604 are arranged in the non-keyboard region. Moreover, the main body interface 1605 is arranged on a surface, facing away from the keyboard, of the fabric keyboard 1603, and the display component interface 1604 is arranged on a surface, provided with the keyboard, of the fabric keyboard 1603. A distance between the display component interface 1604 and the keyboard region is less than a distance between the main body interface 1605 and the keyboard region, so that it easy for the user to watch the display component.

In the first state, as illustrated in FIG. 16, the main body 1601 and the display component 1602 are respectively connected to the main body interface 1605 and the display component interface 1604 of the fabric keyboard 1603, and the main body 1601 and the display component 1602 are attracted and connected with each other by the adsorption member provided in the non-keyboard region of the fabric keyboard 1603, and the non-keyboard region is in the direction away from the user. At this time, one side of the non-keyboard region of the fabric keyboard 1603 is closely attached to the main body 1601, and the other side of the non-keyboard region of the fabric keyboard 1603 is closely attached to a side of the display component 1602 having no screen. The adsorption member disposed in the non-keyboard region of the fabric keyboard 1603 closely attracts the display component 1602 and the main body 1601 together, the bottom of the display component 1602 communicates with the fabric keyboard 1603 through the display component interface.

In the first state, the keyboard region of the fabric keyboard 1603 for example is attached to the surface of the display component 1602 through the adsorption member, so that it is easy to carry the computer.

In the second state, as illustrated in FIG. 17, the main body 1601 and the display component 1602 are respectively connected to the main body interface 1605 and the display component interface 1604 of the fabric keyboard 1603. The display component 1602 leans against the main body 1601 and is placed at a set angle with respect to the horizontal surface.

In the second state, the fabric keyboard 1603 which is soft has a function of the keyboard and a function of connecting the display component 1602 and the main body 1601. The fabric keyboard 1603 is unfolded, the bottom of the display component 1602 is connected with the display component interface provided on the fabric keyboard 1603, the main body interface provided on the fabric keyboard 1603 is connected with the main body 1601, and the fabric keyboard 1603 is attached to the shell of the main body 1601 by the adsorption member disposed in the non-keyboard region of the fabric keyboard 1603, at this time, the inclined angle of the display component 1602 is adjusted to achieve a desired display effect.

For example, the display component interface 1604 is a socket, so that the display component 1602 is further stabilized. The main body interface 1605 is a contact point.

In the embodiment, as illustrated in FIG. 18, the fabric keyboard 1603 which is soft is wrapped around the surface of the shell of the main body 1601, and the fabric keyboard 1603 and the main body 1601 are closely attracted with each other together by the adsorption member disposed in the fabric keyboard 1603, at this time, the main body 1601 is independently moved and used.

In the above embodiments of the present disclosure, the main body at least comprises a central processor unit (CPU), in addition, the main body for example further comprises a memory, a hard disk, an optical disc drive, a power source, an input and output controller and interfaces.

What is described above is only related to the illustrative embodiments of the present disclosure and descriptions of the used technical principles. It should be understood by those skilled in the art that the scope of the present disclosure involved in the embodiments of the present disclosure is not limited to the technical solutions of the specific combination of the above technical features. Other technical solutions formed by any combinations of the above technical features or equivalent features thereof without departing from the inventive concept are also included. For example, the technical solutions formed by the above features and the technical features having similar functions disclosed in the embodiments of the present disclosure (but not limited to) are mutually replaced.

What is claimed is:

1. A computer, comprising:
    a display component, having a display surface;
    a main body, comprising a central processor unit and having a reference surface; and
    a connector component, configured to connect the display component and the main body and to maintain a relative position of the display component and the main body to be at least in a first state and a second state, wherein
    in the first state, a first angle is between the display surface of the display component and the reference surface of the main body;
    in the second state, a second angle is between the display surface of the display component and the reference surface of the main body, the first angle is different from the second angle, and the second angle is not zero;
    in the first state and in the second state, the main body is located on a side of the display component facing away from the display surface; and
    the connector component comprises a main body box having a first accommodation space, and the main body box is configured that the main body is removable from the first accommodation space.

2. The computer according to claim 1, wherein the connector component comprises at least one rotating shaft, and the main body and the display component are connected by the at least one rotating shaft to be rotatable with respect to each other.

3. The computer according to claim 2, wherein
    the display component has a first edge portion, and the main body has a second edge portion and a third edge portion opposite to each other;
    in the first state, the second edge portion of the main body is closer to the at least one rotating shaft than the third edge portion of the main body, and the at least one rotating shaft is closer to the first edge portion of the display component than the third edge portion of the main body.

4. The computer according to claim 2, wherein
    the display component has a first edge portion, and the main body has a second edge portion and a third edge portion opposite to each other;
    in the first state, the second edge portion of the main body is closer to the at least one rotating shaft than the third edge portion of the main body, and the at least one rotating shaft is farther away from the first edge portion of the display component than the third edge portion of the main body.

5. The computer according to claim 2, wherein at least one of the display component and the main body is provided with an adsorption member, and the display component and the main body are attracted to each other together by the adsorption member.

6. The computer according to claim 2, wherein the at least one rotating shaft is connected to the display component by a back plate.

7. The computer according to claim 6, wherein at least one of the display component, the back plate and the main body is provided with an adsorption member, at least another one of the display component, the back plate and the main body is attracted to the at least one of the display component, the back plate and the main body by the adsorption member.

8. The computer according to claim 2, wherein the at least one rotating shaft comprises at least one of a first rotating shaft and a second rotating shaft, the connector component further comprises a bracket plate, the bracket plate and the display component are connected by the first rotating shaft to be rotatable with respect to each other, and the bracket plate and the main body are connected by the second rotating shaft to be rotatable with respect to each other.

9. The computer according to claim 8, wherein the at least one rotating shaft comprises the first rotating shaft and the second rotating shaft, and the first rotating shaft and the second rotating shaft are located at opposite ends of the bracket plate.

10. The computer according to claim 1, wherein in the first state, a hole for hanging is disposed on a side of the main body facing away from the display component.

11. The computer according to claim 1, further comprising a keyboard rotating shaft and a keyboard, wherein the display component and the keyboard are rotatable with respect to each other by the keyboard rotating shaft.

12. The computer according to claim 1, further comprising a keyboard and an accessory accommodation base plate, wherein
    the accessory accommodation base plate is fixedly connected to the main body box, and
    the keyboard and the accessory accommodation base plate are configured to constitute a second accommodation space for accommodating a computer accessory.

13. The computer according to claim 12, wherein an upper surface of the keyboard is concave.

14. The computer according to claim 12, wherein a back portion of the main body box is provided with an adsorption member for purpose of attracting the keyboard so that the keyboard is accommodated at the back portion of the main body box.

15. A computer, comprising:
    a display component, having a display surface;
    a main body, comprising a central processor unit and having a reference surface; and
    a connector component, configured to connect the display component and the main body and to maintain a relative position of the display component and the main body to be at least in a first state and a second state, wherein
    in the first state, a first angle is between the display surface of the display component and the reference surface of the main body;
    in the second state, a second angle is between the display surface of the display component and the reference surface of the main body, the first angle is different from the second angle, and the second angle is not zero;

in the first state and in the second state, the main body is located on a side of the display component facing away from the display surface;

the connector component comprises a fabric and an adsorption member, and a main body interface and a display component interface are disposed on the fabric and are located on two surfaces, facing away from each other, of the fabric;

in the first state, the main body and the display component are respectively connected to the main body interface and the display component interface provided on the fabric, and the main body and the display component are attracted to each other together by the adsorption member.

16. The computer according to claim 15, wherein the adsorption member is located in a region, provided with no keyboard, of the fabric.

17. The computer according to claim 15, further comprising a keyboard, wherein the keyboard is connected to a surface of the fabric facing away from the main body interface.

18. The computer according to claim 17, wherein the keyboard is attachable to the display component.

* * * * *